United States Patent [19]

Laforest et al.

[11] Patent Number: 5,291,787
[45] Date of Patent: Mar. 8, 1994

[54] TRIAXIAL VIBRATING PLATFORM, PARTICULARLY FOR HELICOPTER SIMULATORS

[75] Inventors: Jacques Laforest, Luce; René Le Guillou, Maurepas, both of France

[73] Assignee: Thomson-CSF, Puteaux, France

[21] Appl. No.: 981,360

[22] Filed: Nov. 25, 1992

[30] Foreign Application Priority Data

Nov. 29, 1991 [FR] France ................................. 91 14815

[51] Int. Cl.⁵ .............................................. B06B 3/00
[52] U.S. Cl. .................................................... 73/663
[58] Field of Search ................. 73/662, 663, 665, 667, 73/583

[56] References Cited

U.S. PATENT DOCUMENTS 3,304,628 2/1967 Kaplan .
4,265,123 5/1981 Cappel .
4,446,742 5/1984 Thompson et al. .
4,875,374 10/1989 Pinson .

FOREIGN PATENT DOCUMENTS 1350941 4/1974 United Kingdom .
8702601 5/1987 World Int. Prop. O. .

Primary Examiner—Hezron E. Williams
Assistant Examiner—Rose M. Finley
Attorney, Agent, or Firm—Oblon, Spivak, McClelland, Maier & Neustadt

[57] ABSTRACT

A vibration testing platform includes, on one side, a fastening point connected to three actuators placed in orthogonal directions to one another by link-rods hinged at both ends thereof and, on the other side, three fastening points, each point being connected to the ground by a link-rod hinged at both ends thereof. The two end link-rods are vertically oriented and the third one is horizontally oriented and placed in a transversal direction.

3 Claims, 1 Drawing Sheet

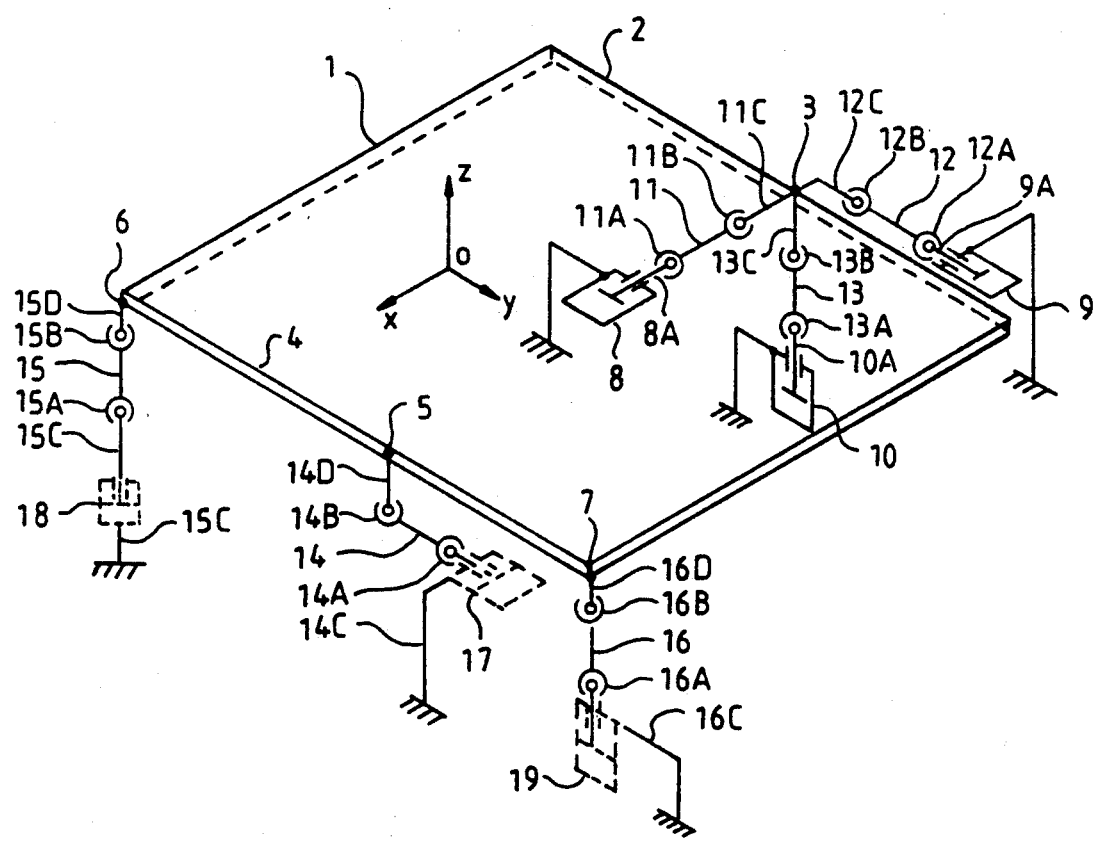

TRIAXIAL VIBRATING PLATFORM, PARTICULARLY FOR HELICOPTER SIMULATORS

BACKGROUND OF THE INVENTION

The present invention relates to a triaxial vibration testing platform, particularly for helicopter simulators.

Helicopters undergo numerous vibrations during flight. These vibrations can be split up into components along three orthogonal axes. To be sufficiently realistic, helicopter simulators should be capable of reproducing these components along all three orthogonal axes.

There are known vibration testing platforms that comprise three or four control hydraulic actuators for each of the three vibrational axes. These actuators, with their hydraulic conduits, occupy a great amount of space, and their numbers make the simulator costly.

SUMMARY OF THE INVENTION

An object of the invention is to provide a triaxial vibration testing platform that occupies as little space as possible, is simple to make and has the lowest possible cost.

The vibration testing platform according to the invention, the general shape of which is substantially rectangular, has four points for the fastening of suspension devices, the first point being substantially in the middle of a first side of the platform, the other three points being distributed along an opposite second side of the platform, one point being substantially in the middle of the second side and the other two points being near the ends of this side, the first fastening point being connected to three suspension devices directed along three orthogonal axes, the other fastening points each being connected to a suspension device, those of the ends being positioned in a vertical direction, and the last one in a horizontal, preferably transversal, direction, at least the suspension devices of the first fastening point being actuators, the piston rods of which are extended by link-rods hinged at both their ends, and the other suspension devices being, as the case may be, link-rods hinged at both their ends.

BRIEF DESCRIPTION OF THE DRAWING

The present invention will be understood more clearly from the following detailed description of an embodiment, taken as a non-restrictive example and illustrated by the appended drawing, in which the single FIGURE is a simplified schematic isometric projection of a vibration testing platform according to the invention.

DESCRIPTION OF THE PREFERRED EMBODIMENT

The vibration testing platform described herein below is that of a helicopter simulator but it is clear that the invention is not restricted to an application such as this and can be implemented in other applications necessitating vibrational motions that occur along three orthogonal axes and have relatively high amplitudes (of up to 20 cm for example).

The sole FIGURE shows a very schematic view of a rectangular platform 1. It is assumed that, at rest, the platform 1 is horizontal. Rectangular coordinate axes Ox, Oy, Oz are defined such that Ox and Oy are in a horizontal plane, Ox being parallel to the longitudinal axis of the platform 1 and Oz being vertical. It is assumed that the transversal side 2 of the platform corresponds to the front of the simulated helicopter.

A point 3 for the fastening of suspension devices is formed in the middle of the side 2. On the opposite side 4, three points 5 to 7 for the fastening of suspension device are formed. The point 5 is in the middle of the side 4, and the points 6 and 7 are at each of the ends of this side.

The suspension devices for the point 3 are three hydraulic actuators 8 to 10, the respective piston rods of which are in a direction parallel to axes Ox, Oy and Oz. The bodies of these actuators are fixed to the ground or to a fixed support such as a thick concrete slab. Their piston rods 8A, 9A, 10A, respectively, are connected to the point 3 by means of preferably identical link-rods 11 to 13 respectively, hinged preferably on pivot joints at their two ends (pivots respectively referenced 11A and 13A on the actuator piston rods side and 11B to 13B on the fastening point 3 side). The pivots 11B to 13B are fixed to the platform 1 by short arms 11C to 13C. At rest (with the platform 1 horizontal), the link-rods are in a position constituting the prolongation of the actuator piston rods 8A to 10A respectively. The point 3 is not necessarily a point in the mathematical sense, but may be a zone with preferably the smallest possible size, in which the arms 11C to 13C of the pivots 11B to 13B are fixed to the platform 1.

Each of the points 5 to 7 is linked to the ground by a link-rod 14 to 16, respectively. These link-rods are preferably identical and are preferably hinged on pivot joints at both their ends. The ground side pivots are referenced 14A to 16A and the platform side pivots are referenced 14B to 16B. At rest, the link-rods 15 and 16 are vertical and the link-rod 14 is horizontal. In the present case, the link-rod 14 is parallel to axis Oy. The pivots 14A to 16A are connected to the ground by arms 14C to 16C respectively and the pivots 14B to 16B are connected to the platform 1 by arms 14D to 16D respectively.

To simulate the vibrational motions undergone by a helicopter cabin, it is enough to apply vibrational motions, by means of the actuators 8 to 10, to the point 3 located at the front of the platform. However, in other applications, it may be necessary also to apply vibrational motions to the rear of the platform. In the latter case, as shown in dashes in the FIGURE, actuators 17 to 19 are inserted between the pivots 14A to 16A and the supporting arms 14C to 16C, so that the piston rods of these actuators are in a position forming a prolongation of the corresponding link-rods.

To understand the working of the device of the invention, it is assumed that the actuators are locked in the idle position (i.e. platform 1 horizontal, piston rods of the actuators retracted or possibly at midpoint on their travel). Although the platform 1 is supported only by link-rods pivoted at both their ends, it can neither move or tilt nor twist because it is held still in the horizontal plane by the three link-rods 13, 15 and 16, and in the direction Ox by the link-rod 11 and in the direction of axis Oy by the two link-rods 12 and 14.

Obviously, numerous modifications and variations of the present invention are possible in light of the above teachings. It is therefore to be understood that within the scope of the appended claims, the invention may be practiced otherwise than as specifically described herein.

What is claimed is:

1. A triaxial vibration testing platform, with a general shape that is substantially rectangular, comprising:
a plurality of suspension devices;
four points for the fastening of said suspension devices, the first fastening point being located substantially in the middle of a first side of the platform, the second, third and fourth fastening points being distributed along a second, opposite side of the platform, the second fastening point being located substantially in the middle of the second side and the third and fourth fastening points being located near the ends of said second side, the first fastening point being connected to first, second and third suspension devices of said plurality of suspension devices wherein said first, second and third suspension devices are directed along three orthogonal axes, respectively, the second, third and fourth fastening points each being respectively connected to fourth, fifth and sixth suspension devices of said plurality of suspension devices, said fifth and sixth suspension devices for said third and fourth fastening points being positioned in a vertical direction, and the fourth suspension device for the second point being positioned in a horizontal direction, wherein at least the first, second and third suspension devices of the first fastening point comprise actuators having piston rods which are extended by first link-rods hinged at both ends thereof, and wherein the fourth, fifth and sixth suspension devices comprise second link-rods hinged at both ends thereof.

2. A platform according to claim 1, wherein at least one of said first and second link rods are hinged on pivot joints.

3. A platform according to claim 1, wherein said fourth suspension device for said second fastening point is positioned in a transversal direction with respect to said fifth and sixth suspension devices.

* * * * *